(12) United States Patent
King

(10) Patent No.: US 10,692,358 B2
(45) Date of Patent: Jun. 23, 2020

(54) PORTABLE SIREN AND EMERGENCY CALL DEVICE AND COMBINATION THEREOF

(71) Applicant: Rudolf King, Altenstadt (DE)

(72) Inventor: Rudolf King, Altenstadt (DE)

( * ) Notice: Subject to any disclaimer, the term of this patent is extended or adjusted under 35 U.S.C. 154(b) by 0 days.

(21) Appl. No.: 16/342,970

(22) PCT Filed: Mar. 13, 2017

(86) PCT No.: PCT/EP2017/055809
§ 371 (c)(1),
(2) Date: Apr. 17, 2019

(87) PCT Pub. No.: WO2018/133955
PCT Pub. Date: Jul. 26, 2018

(65) Prior Publication Data
US 2019/0272733 A1    Sep. 5, 2019

(30) Foreign Application Priority Data

Jan. 20, 2017   (DE) .................. 20 2017 000 518 U

(51) Int. Cl.
| | | |
|---|---|---|
| *G08B 25/00* | (2006.01) | |
| *H04W 4/90* | (2018.01) | |
| *G08B 25/01* | (2006.01) | |
| *G08B 3/10* | (2006.01) | |
| *G08B 15/02* | (2006.01) | |
| *G08B 15/00* | (2006.01) | |
| *G08B 21/02* | (2006.01) | |

(52) U.S. Cl.
CPC ............. *G08B 25/016* (2013.01); *G08B 3/10* (2013.01); *G08B 15/004* (2013.01); *G08B 15/02* (2013.01); *H04W 4/90* (2018.02); *G08B 21/02* (2013.01)

(58) Field of Classification Search
CPC ...... G08B 25/016; G08B 3/10; G08B 15/004; G08B 15/02; G08B 21/02; H04W 4/90
See application file for complete search history.

(56) References Cited

U.S. PATENT DOCUMENTS

| | | | | |
|---|---|---|---|---|
| 5,489,045 A | * | 2/1996 | Jennings | ............... G08B 15/02 |
| | | | | 116/77 |
| 9,336,663 B1 | * | 5/2016 | Cohen | .................... G08B 13/02 |
| 9,476,680 B2 | * | 10/2016 | Kalina | ................... G08B 15/00 |
| 2004/0037016 A1 | * | 2/2004 | Kaneko | .................. G06F 3/016 |
| | | | | 361/1 |
| 2004/0066299 A1 | * | 4/2004 | Hanabusa | ........... G08B 15/004 |
| | | | | 340/574 |

(Continued)

FOREIGN PATENT DOCUMENTS

| | | |
|---|---|---|
| DE | 3008846 A1 | 10/1981 |
| WO | 2010084328 A1 | 7/2010 |

OTHER PUBLICATIONS

International Search Report of PCT Patent Application No. PCT/EP2017/055809 dated Aug. 22, 2017.

*Primary Examiner* — Thomas D Alunkal

(57) ABSTRACT

Portable siren or emergency call device with a portable siren, comprising a loudspeaker (8), so as to emit an audio signal, preferably with a high sound pressure; an inner and/or outer switching element (14) for turning off and preferably for turning the audio signal on and off, and an outer switch and/or outer dummy switch (4).

23 Claims, 7 Drawing Sheets

(56) References Cited

U.S. PATENT DOCUMENTS

| | | | |
|---|---|---|---|
| 2015/0127965 A1* | 5/2015 | Hong | G06F 1/1694 |
| | | | 713/323 |
| 2016/0192164 A1* | 6/2016 | Scully | G08B 25/016 |
| | | | 455/404.2 |
| 2017/0060259 A1* | 3/2017 | Yang | G06F 3/0227 |

* cited by examiner

PORTABLE SIREN AND EMERGENCY CALL DEVICE AND COMBINATION THEREOF

The present invention relates to a portable siren or also a pocket alarm, with a loudspeaker that is able to emit an audio signal with preferably a high sound pressure, as well as an internal switching element for turning off and preferably for turning on and off the audio signal, as well as an outer switch or an outer dummy switch.

Already known are portable sirens and emergency call devices, which are also known as pocket alarms or "shrill alarms", with emergency call devices also being known. A pocket alarm is intended to keep an attacker or pickpocket from continuing with his or her action by emitting a loud sound, which draws attention to a theft or an attack. This additional attention is here intended to prompt the attacker or thief to terminate the attack or drop the stolen item.

Mobile emergency backup devices have been on the market since about 2009, and are widely available thanks to the emergence of smartphones, i.e., cell phones with computing power and GPS positioning. The position of the user is here determined continuously or after an alarm has been triggered, and a message is sent to a predetermined person, company, organization or group of people, primarily via mobile internet, WLAN and/or text messaging (SMS).

All devices share in common that the manual activation to trigger the alarm can routinely take place on the device itself.

Also known are emergency call devices which, when activated, send a location and emergency situation signal to a control center so as to notify the police or some other emergency service and summon them to the scene of an emergency.

A first aspect of the present invention provides a portable siren, which comprises a loudspeaker, an inner and/or outer switching element and an outer switch or an outer dummy switch. The portable siren will additionally be provided with a housing for a power supply, a sound generator and possible other circuits, which the expert takes for granted, without having to here explicitly list a series of obvious components. The loudspeaker is provided to emit an audio signal, preferably with a high sound pressure. As a consequence, the siren serves to acoustically draw attention to the siren and an event in the area of the siren. The siren further comprises an inner and/or outer switching element for turning off and preferably also for turning on and off the sound signal. The inner and/or outer switching element cannot be activated for deactivation purposes with no problem and without a tool.

The inner and/or outer switching element is typically to be activated by virtue of the fact that the housing is fastened to a cord, preferably with a plug cap, which in turn is fastened to a pocket, wallet, keychain or article of clothing of the user, and which activates the siren when the cord is detached from the housing. Reattaching the cord or plug makes it possible to turn off the siren by means of the inner switching element. Further present on the portable siren is an outer switch and/or an outer dummy switch. The inner and/or outer switching element or also the outer switch can be used to turn on the sound signal or trigger the siren. The outer switch or outer dummy switch or outer dummy switches is/are used to draw the attention of a person bothered by the siren away from the victim and to the siren, and to prompt the person to activate the outer switch or outer dummy switch in an attempt to turn off the siren. By activating the outer switch or outer dummy switch, the person ceases his or her planned action, and deals with the portable siren, possibly giving the person who triggered this siren or audio signal enough time to escape. The outer switch and/or the outer dummy switch can here also be designed as a key or dummy key. In addition, the audio signal can be a whistle, a whistle sequence or a cry/call for help or the police. In a simple configuration, the audio signal is a simple sound emitted with a volume lying above the pain threshold inside of 2 meters, i.e., sound pressure level values of between at least 120 dB and at least 140 dB or sound pressures of between at least 20 Pa and at least 200 Pa (depending on the pitch and desired pain intensity). It can likewise be provided that two sounds be used so as to generate a beat that is generally perceived as a very unpleasant audio signal. Let it be noted that sounds other than those perceived as especially unpleasant can also be used as the audio signal. A beat can be very easily generated by two loudspeakers that use respective sounds with a slightly different frequency.

Even given only one outer dummy switch that has no function and gives the impression of an off switch for the audio signal, an attacker can be distracted long enough to allow a cornered person to escape.

OPERATING PRINCIPLE

Combining an outer switch that does not turn off the siren and/or an outer dummy switch with the alarm trigger of the mPERS results in a new operating principle: Regardless of how the action continues, i.e., even if the victim is subsequently taken from the scene of the crime, a siren is typically found at the location where the alarm was triggered. This enables a securing of evidence, which through fingerprints and DNA points to the perpetrator, and can tie him or her to the location of the event. This can lead to an arrest, and above all also undermine the two most important defense strategies in court, specifically that a case of mistaken identity or consensual activities was involved, so that the perpetrator is convicted based on evidence instead of one word against another.

ADDITIONAL EMBODIMENTS

In another embodiment of the portable siren, the outer switch only makes it possible to turn on, but not turn off the audio signal. As a result, the portable siren or audio signal can also be activated by the outer switch. The key can be characterized as an on- or off-switch, so as to create the impression that there was a simple way to quickly turn off the audio signal. In this embodiment, it might be possible to do without an inner switching element for turning on, but not an inner switching element for turning off.

In another embodiment of the portable siren, the outer switch and/or outer dummy switch has a key path and/or a key stop and/or a key sound as a response to activation during an activation. As a consequence, the user is provided with a haptic or acoustic response by activating the outer switch and/or outer dummy switch. In a preferred embodiment of the outer switch and/or outer dummy switch, the acoustic or haptic response creates the impression of a jammed or damaged outer switch, inducing a user to press on the outer switch and/or outer dummy switch with more force. In another embodiment, activating the outer switch and/or outer dummy switch requires an elevated activating force after a short switch or key path. The elevated activating force can be used especially effectively in the following embodiments to better collect traces of the perpetrator on the portable siren.

Another embodiment of the present invention relates to a portable siren, whose outer switch and/or whose outer dummy switch is provided with a device for recording a fingerprint or thumbprint of a finger or thumb that activates the outer switch and/or outer dummy switch. The fingerprint sensor can be designed as an electronic fingerprint sensor, which electronically records a line pattern of the tip of a finger or thumb. The recorded fingerprint can be stored in the portable siren and later read out. The recorded fingerprint can also be transmitted to a control center or emergency call center via a radio interface or mobile radio interface. It is likewise possible to transmit he fingerprint to an emergency call device located nearby via a respectively present short-range radio transmission interface, wherein the emergency call device can store the electronically present fingerprint and/or transmit it to a corresponding control center via a (mobile) radio interface. An electronic recording with or without transmission also makes it possible to record several fingerprints, for example if several people try to turn off the portable siren by pressing on the outer switch and/or outer dummy switch. Another advantage to electronically recording or capturing fingerprints is that several images of the same fingerprint can be recorded, for example so that, given several recordings, the best one or an overlap of several recordings can yield a usable fingerprint.

It can also be provided that a surface of the outer switch and/or outer dummy switch be set up to record a fingerprint when activated. The surface of the outer switch and/or outer dummy switch can here comprise a plastically deformable component, which directly records or imprints the fingertip that activates the outer switch and/or outer dummy switch. It can also be provided that the surface of the outer switch and/or outer dummy switch be provided with a chemical component, which is especially suitable for securing a fingerprint. It can be provided that use be made of an adhesive surface, for example, wherein cells from a top layer of skin of a fingertip are fixed on this surface, thereby capturing an image of a fingerprint.

It is likewise provided that a film be arranged on the outer surface of the outer switch, which is rolled into a housing of the portable siren and thereby secured in a later step. To this end, a film on the surface can be pulled into the housing after an activation. This arrangement consists of four layers in all, and given a suitable configuration can be pulled directly into the device during activation under the fingertip, without damaging the fingerprint. While pulling in, the fingerprint can also be secured by the lower film.

In an additional embodiment of the present invention, the outer switch and/or outer dummy switch has an injuring means, which is set up to take a tissue sample from the fingertip and/or injure the skin of a user during activation. The injuring means is here to be configured so as to separate and secure at least skin cells from the callous of a fingertip that actuates the outer switch and/or outer dummy switch. In this conjunction, the injuring means is to enable a securing of a DNA sample, removing at least a portion of a callous. In other embodiments, a blood and/or tissue sample is to be taken from a fingertip by the injuring means. In a simple embodiment, the injuring means can here consist of a sharp edge of the outer switch and/or outer dummy switch. In another simple embodiment, a needle can be arranged under the key, which protrudes over a surface of the activated outer switch upon activation of the outer switch and/or outer dummy switch.

In an embodiment of the portable siren, the injuring means comprises at least one sharp or jagged edge or sharp or jagged structures. These structures can be relatively small, so as only to remove skin cells from the callous, but can likewise be large enough to cause bleeding. Capillaries, grooves or a fleece can also be provided for exiting blood, so that a blood and/or DNA-based identification can later be made of a person who tried to activate the outer switch and/or outer dummy switch or tried to wipe off the fingerprint and injured him or herself in the process.

In an exemplary embodiment of the portable siren, the injuring means comprises at least one needle, hollow needle and/or at least one lancet or blade, which is preferably provided with barbs. A simple needle can serve to cause a bleeding wound, wherein exiting blood can be captured directly on a surface of the portable siren. A hollow needle makes it possible to directly take a tissue and blood sample, and cause a small, stronger wound that bleeds for a longer time. In hollow needles, barbs can reliably trap in particular a tissue sample inside of the hollow needle. A lancet can produce a longer and deeper wound. A blade would make it possible to produce a wound of any shape.

In a somewhat further developed embodiment of the portable siren, the injuring means is provided with barbs and detachable from the siren, so that a portion of the injuring means or the entire injuring means can remain in the wound upon activation. For example, this can be achieved by a harpoon placed inside of a hollow needle. If the hollow needle penetrates the skin, the harpoon can be fixed in the tissue by the barbs, and pulled out of the hollow needle when lifting up the fingertip. The harpoon can consist of a photoetched metal strip into which is etched a message to a person who is to remove the harpoon at a hospital. For example, the message can read "criminal" or "crime" or the like, which can be easily included on a harpoon measuring a few millimeters. A microstent can likewise be placed into the wound to keep the wound open longer.

In an additional embodiment of the portable siren, the injuring means is further provided with an injection device, so as to introduce a liquid into the wound, preferably an irritant, a medication and/or a pigment or pigment solution. This makes it easy to mark the fingertip of the person who activates the outer switch or outer dummy switch via an injection. For example, it is possible to use one or more points as the mark. It can also be provided that a pigment only visible under UV or fluorescent light be used so as not to reveal to the injured person that he or she has been marked, as a result of which the person is not induced to remove the marking. It is likewise possible to inject a means that encourages bleeding to prevent the wound from quickly closing and keep the bleeding going for a longer time. Since the injury is rather small, like one or several pinpricks, even a longer period of bleeding cannot lead to a life-threatening blood loss. Since it is assumed that the person who activates the outer switch or outer dummy switch of the portable siren does so in conjunction with a crime or attempted crime, a wound that bleeds longer can produce a trail of blood that leads directly or indirectly to the perpetrator. It can also be provided that an irritant such as piperine, capsaicin, uranine, eosin Y, rhodamine or salt be introduced into the wound, so as to make the wound more painful. The irritants should here be introduced into the wound in an essentially harmless amount, so that death or long-term damage in a person can be virtually precluded. The objective of these measures is to distract an attacker and occupy him or her to an extent where he or she cannot or at least does not want to continue with the planned attack. Another objective is to mark the attacker so he or she can be better identified. Yet another objective lies in identifying the attacker, which can be done through tissue and blood samples that are analyzed by a laboratory and compared with a criminological database, or can at least be recorded therein for first offenders.

During an attack, an attacked person will trigger or activate the portable siren or audio signal and drop it. The attacking person will be distracted by the volume of the audio signal and the attention it generates, and will try to turn off the portable siren again. An outer switch or outer dummy switch marked as a visible off-switch is intended to induce the attacker to press the latter in an attempt to turn off the audio signal. When the outer switch or outer dummy switch is activated to turn off the audio signal and thus eliminate the attention, the attacker is distracted, loses time and attention relative to the attacked person, is marked as an attacker, can be identified by the samples/fingerprints taken, and is further diminished in his or her ability to attack by an injury, pain and minor blood loss.

Another embodiment of the portable siren comprises an injuring means provided with an automatic pricking and/or retraction function, which preferably takes the form of a single pricking and/or retraction function. The pricking and/or retraction function can involve a lancet, a needle or a hollow needle or a sampling hollow needle. The pricking and/or retraction function can here be designed similarly to safety lancets of the kind known from the medical sector. The pricking and/or retraction function is here merely intended to ensure that a sample is taken from only the first person who activates the outer switch or outer dummy switch, or that only this person be pricked. In an ideal scenario, the portable siren should remain at the crime scene, and be found and analyzed by another person, preferably security forces such as the police. If a passerby who later comes across the crime scene picks up the siren and wants to turn off the audio signal, he or she should not be injured, since this could destroy the traces of an original attacker. Furthermore, the pricking and/or retraction function can prevent other people from being injured by the injuring means.

In another embodiment of the portable siren, the injuring means is set up to produce an injury in the form of a symbol. For example, this can take place in the form of the paragraph symbol "§", so that a person called upon to treat the wound will in any event remember the shape of the wound and either report this to the authorities right away and/or recall this from memory during a trial. It is also possible to secure the blades to the edge of the outer switch, so as to thereby produce a rectangular or square wound. Other shapes and symbols are also possible. It can be provided that the injury also lacerate the area of the finger from which a fingerprint is taken, and make the wound recognizable when fingerprints are subsequently taken. It can be provided that the injuring means be designed or treated with medication in such a way as to leave behind a distinct scar.

Another exemplary embodiment of the portable siren further comprises at least one sprayer. The at least one sprayer is provided for spraying one or more liquids or fluids. The sprayer is connected with the outer switch and/or outer dummy switch, so as to spray the one or several liquids or fluids upon activating the outer switch or outer dummy switch. The liquids are preferably sprayed toward the key, and at the same time past the latter toward the face of an attacker or activator. The function can here correspond to that of a "splash ring joke article". The fluids can here consist of a difficult to remove dye, a capsaicin or irritant-containing liquid or an odor-intensive liquid, such as butyric acid or skunk secretion. The used liquid quantities are here very slight, and only consist of several drops or milliliters, and the range of the spraying process can also be confined to approx. an arm's length or approx. one meter, so as not to endanger any other people.

In another embodiment of the portable siren, the outer switch and/or outer dummy switch is illuminated, with the portable siren preferably comprising a device that illuminates the outer switch and/or outer dummy switch while or after triggering the audio signal. This embodiment is intended to draw the attention of the person to the outer switch and/or outer dummy switch, so as to induce him or her to activate the outer switch and/or outer dummy switch.

In another embodiment of the portable siren, the outer switch and/or outer dummy switch is marked in color and/or by a symbol, preferably by an on/off switching symbol or a sound-off symbol, to make it more recognizable. This embodiment is intended to induce a person who feels disturbed by the portable siren or the activated audio signal to activate the outer switch or outer dummy switch. The symbol can also be illuminated, or the switch can have a "night design", in which the symbol on the switch and possibly an all-round lighting of the outer switch or outer dummy switch are illuminated. This embodiment is configured in particular for situations in which an attack is expected in the evening or at night, and to be countered by the portable siren. In particular even given a poor visibility, the night design makes it possible to induce the attacker to attempt to turn off the audio signal of the activated, portable siren by activating the outer switch or outer dummy switch.

An additional embodiment of the portable siren further comprises a lamp and/or stroboscope flash, which is activated when the audio signal is turned on. The stroboscope flash can also be triggered only after the outer switch or outer dummy switch is activated, so as to induce an attacker to throw away the portable siren, which serves as a track carrier upon activation of the outer switch or outer dummy switch, and absent him or herself from the audio signal and light flash source. One advantage to activating the stroboscope flash later is that an attacker is not blinded before activating the outer switch or outer dummy switch, and can thus better recognize one or more symbols on the outer switch or outer dummy switch. It can also be provided that the stroboscope flash be flashing the colors and pulse patterns of the emergency vehicles of the local security forces. For example, such a flash pattern could prompt a driver of a kidnap or getaway vehicle to leave the scene of an attack earlier than planned, and thereby prevent a flight or kidnapping of people who are not yet located in the vehicle.

The portable siren can further comprise a local or global positioning component and/or a communications component, which are preferably activated with the audio signal turned on. A global positioning component can consist of a GPS receiver, a GLONAS receiver, a Galileo receiver, a Beidou receiver or also an IRNSS receiver. These satellite-supported positioning systems make it possible to determine a location where the audio signal is triggered as a sign for an attack or emergency situation. For example, a communications component can consist of a mobile radio-based system, by means of which the current position of the portable siren determined by the positioning component is relayed to a control center of security agencies. An emergency vehicle or patrol can then be dispatched to the location of an attack, in addition to which the security agencies can secure the portable siren as a track carrier, wherein the tracks can later be used when determining the identity of an attacker or during a subsequent trial.

In another embodiment, the portable siren can further comprise a bang signaling device, which is triggered upon activation of the outer switch or outer dummy switch, preferably with the audio signal turned on. The bang signaling device can generate a single bang or a sequence of several bangs. A bang can be generated by a detonator or blank cartridge. The gas released during the bang can be guided through a line under the switch/dummy switch, so as to generate a strong fingerprint. It is also possible to guide the gas released during the bang to a surface of the portable siren, so as to leave traces of smoke behind on the hand that holds the portable siren, for example which can be detected with a paraffin test. Here as well, the size of the charge or detonator or primer should be selected in such a way that no lasting damage to the person triggering the bang signal device is to be expected, if only to avoid lasting damage given incorrect operations by the user.

An additional embodiment of the portable siren comprises an outer switch, which is set up to not turn off the audio signal, but only to briefly interrupt it for preferably 0.5 to 5, further preferably 1 to 4 and even further preferably 1.5 to 3 seconds. This shows the person who activates the switch a first time that the outer switch actually has a function, causing the person to again activate the outer switch after the audio signal has been interrupted and the audio signal resumes. This "reactivation" time interrupts an attack, and distracts an attacker. Feeling that he or she has turned off the siren, the perpetrator will drop the latter and continue the attack, only to then be startled again over and over. This distraction can allow an attacked person to flee the attack or possible kidnapping. It can likewise be provided that the interruption function turn the audio signal back on regardless of whether the outer switch is activated or not, so as to prevent the attacker from interrupting the audio signal for good by permanently activating the switch.

In a modification, the first alarm can be delayed by a few fractions of a second or even seconds. In this configuration, the victim will preferably throw the device in front of the attacker. The attacker will step over the device and then be startled by the siren now lying behind him or her and emitting a signal, and be forced to turn away from the victim.

In an additional exemplary embodiment of the portable siren, the latter further has a sound recorder and/or a camera. Recording sound is of interest above all given interrupted audio signals or, as proposed above, audio signals that have been briefly turned off, so as to record acoustic traces. By contrast, only a very limitedly meaningful sound recording, if any, will be possible while the audio signal is being emitted. The sound recorder can be configured in such a way as to start recording sound upon activation of the portable siren, while the audio signal is only triggered after a delay of 1 to 3 seconds. Given an audio signal that has pauses, it may make sense to also record sound during the signal pauses.

In a modification, a camera can be fastened to the portable siren in such a way next to the outer switch as to record in a direction in which the face of a person activating the switch is expected. The outer switch should here be arranged on the portable siren in such a way that it can preferably be activated with the thumb while the remaining fingers grip a housing of the portable siren. If the portable siren is held in such a way that a person can activate the outer switch the easiest, the camera should record the face of an activator past the thumb that activates the switch. It is possible to let the camera record a single image or a series of images upon activation of the outer switch. However, it is preferred that the camera be used as a video camera, and have the camera take a video for 5, preferably 10 or even 15 minutes after or upon activation of the portable siren. The camera is preferably not to be recognized as one from outside, and can be hidden in a dummy screw, for example. An activated stroboscope light can here also serve as a flash, so as to obtain a better image of an attacker or activator of the outer switch under unfavorable lighting conditions. A video and sound recording can also record the reaction of a person who activates the switch or dummy switch, so as to improve the device even further, in particular to find out which of the activities generated by the portable siren leads to an activation of the outer switch or outer dummy switch of the device contributes the most to terminating an attack. In addition, the reaction recorded by the attacker can also be used for manhunt purposes, in particular for public manhunts, for example on the internet or in broadcasts. In addition, the reactions recorded by the attacker on the portable siren can be used for advertising purposes by the manufacturer of the portable siren.

An additional embodiment of the portable siren is further provided with skin contacts and an electric pulse generator. The skin contacts are connected with the electric pulse generator. The portable siren is configured to emit electric pulses from the electric pulse device to the skin contacts when the outer switch or outer dummy switch is activated. This should cause the attacker to drop the siren that he or she picked up. It can also be provided that the portable siren is configured to control the electric pulse generator in such a way that an electric pulse is emitted to the skin contacts only given a second activation of the outer switch or outer dummy switch. The form of the electric pulse can likewise be designed as either a direct current pulse or alternating current pulse. A direct current pulse can make the attacker grip the portable siren more tightly, and thereby leave behind clearer traces on the portable siren. An alternating current pulse can make the attacker drop the portable siren right away. As a result, the attacker must first pick up the siren once more to try and turn it off again. Another advantage to a later activation lies in the fact that a person who inadvertently triggers the portable siren does not immediately get shocked, even given an incorrect operation.

An additional embodiment of the present invention provides a portable siren that can be connected with an emergency call device via a detachable mechanical, electrical and/or radio interface, wherein the portable siren is configured to trigger the audio signal to a connected emergency call device given a separation of the interface.

This embodiment provides for an optional combination in which, given a separation, an emergency call device transmits an emergency call on the one hand, and the portable siren is activated on the other to send out an audio signal to draw acoustic attention to an emergency situation, such as an attack. It is likewise possible to provide the portable siren with a tear-off switch or trigger pin, wherein if the trigger pin is torn off or pulled out, the audio signal is triggered right away or after a delay. The audio signal can then only be turned off once the trigger pin has been reinserted.

It is likewise possible to turn off the audio signal by pressing the inner switching element or outer switch only once the portable siren has been reconnected with the emergency call device via the mechanical, electrical and/or radio interface. To this end, a simple circuit can be selected, in which the outer switch can be used for turning off the audio signal when the connection has been reestablished via the interface, wherein given a connected interface, the outer switch preferably only functions as an off-switch, without activating the injuring, marking or other function described above.

The present invention also relates to an emergency call device with a local or global positioning component and a communications component along with an emergency call triggering device. The emergency call device can be connected with a portable siren as described above via a detachable mechanical, electrical and/or radio interface. The emergency call device is further configured to transmit an emergency call by way of the communications component to a portable siren connected via the interface given a separation of the interface.

In another embodiment of the emergency call device, the latter is configured to trigger the audio signal via a radio connection given a separation of the interface. The inner switching element is here designed to turn the portable siren on and off as a radio-activated switching element, wherein any attempt to oneself turn off the portable siren without operating the emergency call device would be impossible from the outset and thus destined to fail. The local separation or remote operation of the portable siren via the emergency call device also blurs the functional relationship between the remote control and portable siren. Another advantage lies in the fact that, given a false triggering of the portable siren, the latter can be turned off on the emergency call device, without having to touch track sensors/carriers on the portable siren.

In another embodiment of the emergency call device, the latter is disguised as another object, for example a piece of jewelry, a keychain, a tampon or handkerchief bin, a packet of cigarettes, or a hip flask. Additional and different forms of the emergency call device can be provided, which conceal the actual function.

Another aspect of the present invention provides a combination of a portable siren and emergency call device, wherein the portable siren and emergency call device are designed as described above. This combination makes it possible on the one hand to carry along only one component or unit for personal safety, without having to take both the emergency call device and portable siren as two individual components. In particular when using a mechanical or electrical (galvanic) connection, the siren can also be supplied from a power supply of the emergency call device, so that only physical storage batteries like "Goldcap™" capacitors are possibly enough to maintain a power supply for the portable siren following a separation of the emergency call device. As a consequence, the status with regard to the power supply of the portable siren no longer has to be monitored or checked, since it is secured by the emergency call device.

Portable siren and/or emergency call device, wherein the portable siren and/or emergency call device is designed as described above, wherein the audio signal is first triggered on the portable siren when two different triggering devices are triggered on the emergency call device. The triggering devices can be designed as a switch, a button, a release cord or a pull switch. The portable siren comprises devices that can lead to injuries during incorrect operation; in order to rule this out, it is provided that the portable siren and/or emergency call device be protected against a false triggering of the audio signal. In an embodiment, the portable siren is activated by a switch on a housing, which can only be activated if a pull switch, pull lock or release cord has been activated. Triggering requires on the one hand that the release cord be tensioned and a switch to be activated.

In another embodiment of the portable siren and/or emergency call device, a mechanical interface covers the outer switch and/or outer dummy switch for as long as the portable siren and emergency call device are connected with each other via the mechanical interface, or the outer switch and/or outer dummy switch are covered by a cover for as long as the audio signal has not been activated. The advantage to a covered outer switch and/or a covered outer dummy switch is that the outer switch and/or outer dummy switch cannot be activated as long as the audio signal has not been activated, or the portable siren has not been separated from the emergency call device. As a result, it can be ensured that a surface of the outer switch and/or outer dummy switch that is intended to take a fingerprint of a person who activates the switch or dummy has not already been contaminated or rendered unusable in advance by other fingerprints.

The present invention will be described below based on figures of exemplary, non-limiting embodiments.

In both the specification and the figures, the same or similar reference numbers are used to refer to the same or similar components and elements. For reasons of brevity, each individual component in the description to each figure will not be repeated if already mentioned in an earlier figure, and would only constitute a redundant repetition. A reference list has been attached.

Figure 1A:
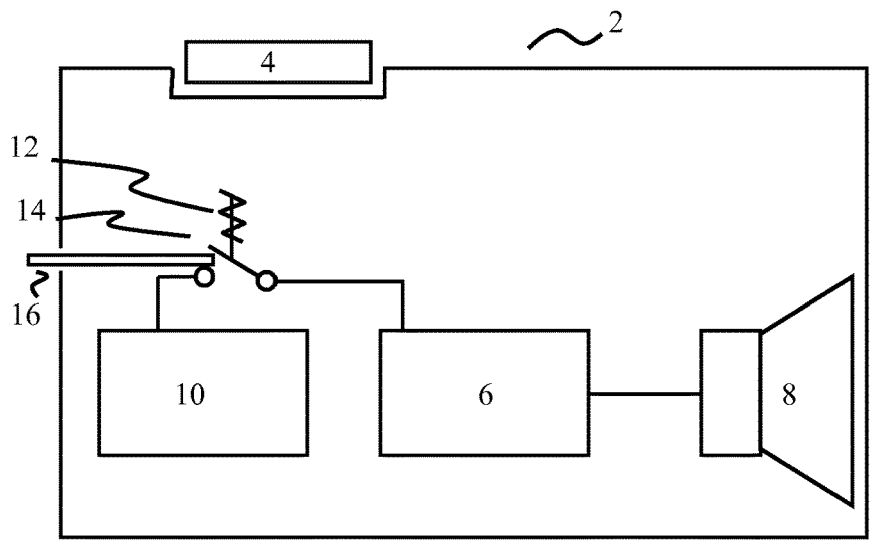
FIG. 1A to 1C show a basic embodiment of the present invention.
Figure 1B:
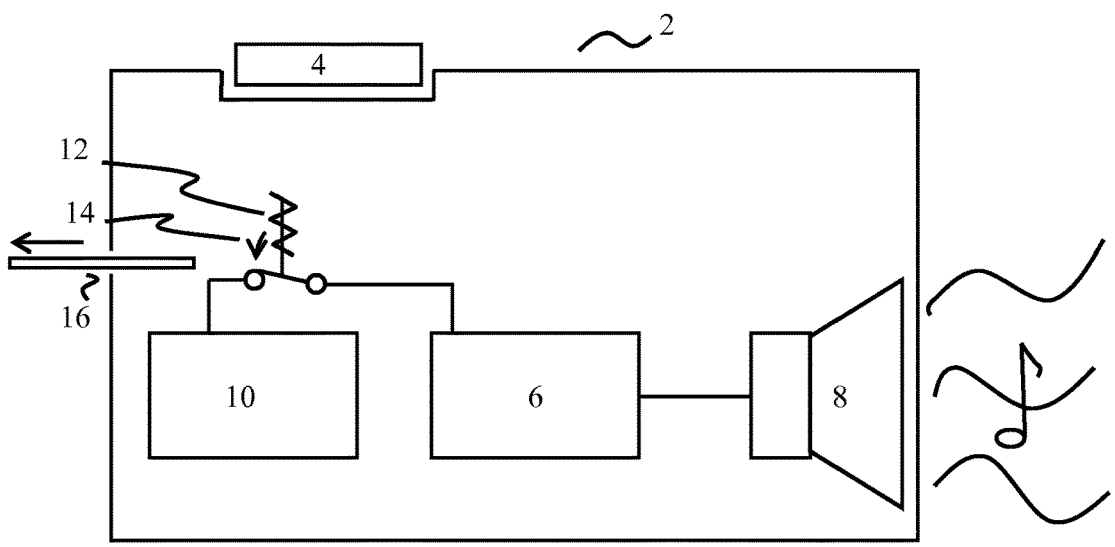
Figure 1C:
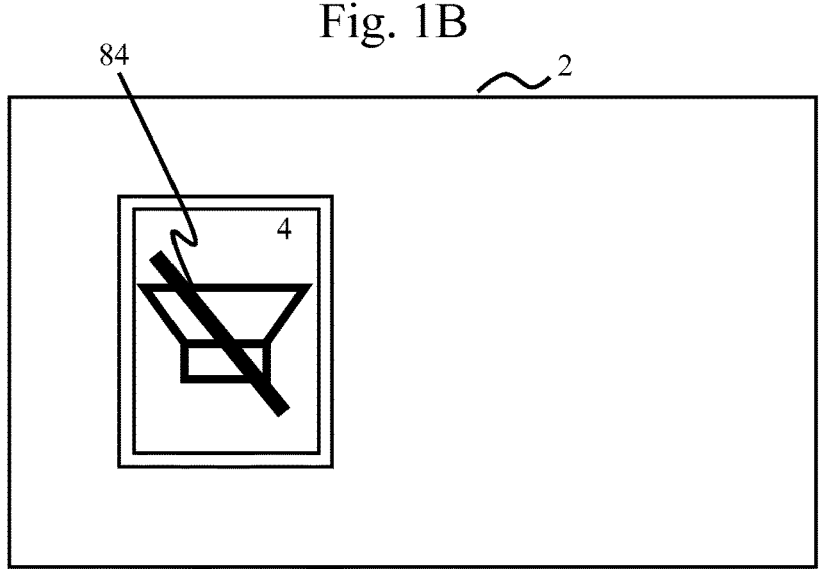

FIGS. 1A to 1C present a basic embodiment of the present invention. FIG. 1A shows a portable siren 2 according to the invention. The siren comprises a housing that has not been marked in any greater detail. The portable siren also comprises an outer switch 4 here designed as an outer dummy switch, which is secured at the top to the housing, but performs no technical function in terms of generating an audio signal or acoustic signal. Secured in the housing is an electroacoustic converter or loudspeaker 8, which is actuated via a control unit 6. The loudspeaker 8 can directly generate the audio signal, or when accompanied by a power supply generate an audio signal from the control device 6 itself. In the second case, at least part of the control device 6 is integrated into the loudspeaker 8. The control device 8 is connected with a power supply 10 via the inner switching element 12, which is designed as a self-closing switch by way of the spring 14. The triggering element 16 prevents the inner switching element 12 from closing, and power from being supplied to the control device. This is the deactivated initial state of the portable siren 2.

On FIG. 1B, the triggering element 16 is pulled out of the housing in the direction of the arrow. Without the triggering element 16, the spring 14 closes the contacts of the inner switching element 12, and the power supply supplies power to the control device 6. The control device 6 in turn supplies the loudspeaker 8 with power or an electrical signal, whereupon the latter emits an audio signal. In this state, the portable siren is preferably dropped. An attacker will feel disturbed by the audio signal, since it is preferably sent out at a volume lying above the pain threshold. The audio signal draws attention to itself, which an average attacker wants to avoid just as much as a corresponding criminal prosecution.

FIG. 1C shows the portable siren 2 as perceived by a disturbed attacker. An elegant, rectangular housing with a large, pleasantly designed button bearing a symbol 84 that promises a deactivation function for the audio signal. In an ideal case, the attacker is here already distracted from his or her original goal to such an extent that allows the attacked person to flee. The attacker will activate the outer switch 4, an confusedly discover that the audio signal does not stop, and either try to activate it again, and give up at the latest 4 more tries later, throw the portable siren away and run away, since the sound cannot be turned off. The time of confusion is here used to give a victim a head start of valuable seconds in which to flee, so that the disturbed and confused attacker ceases his or her action and also runs away.

Figure 2A:
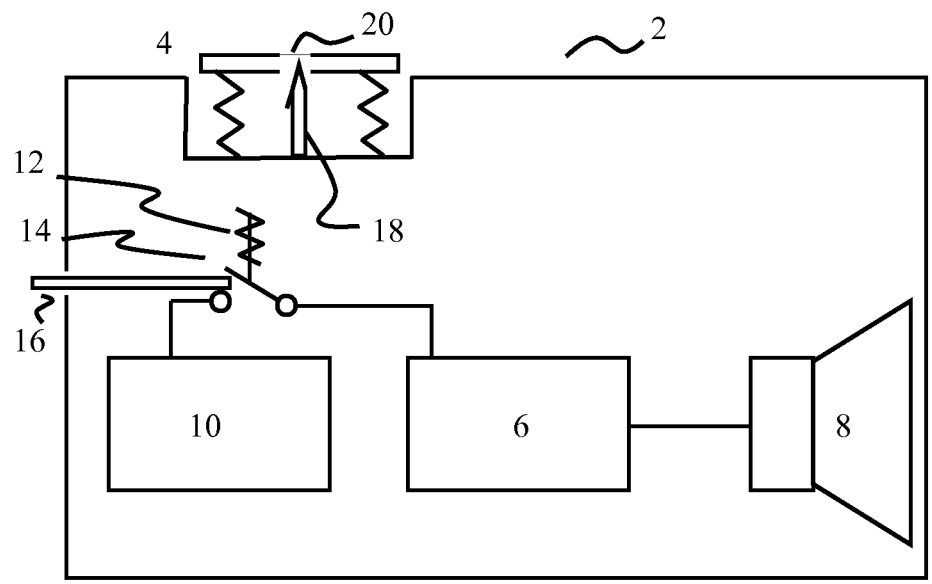
FIGS. 2A to 9 show further developments of the basic embodiment.
Figure 2B:
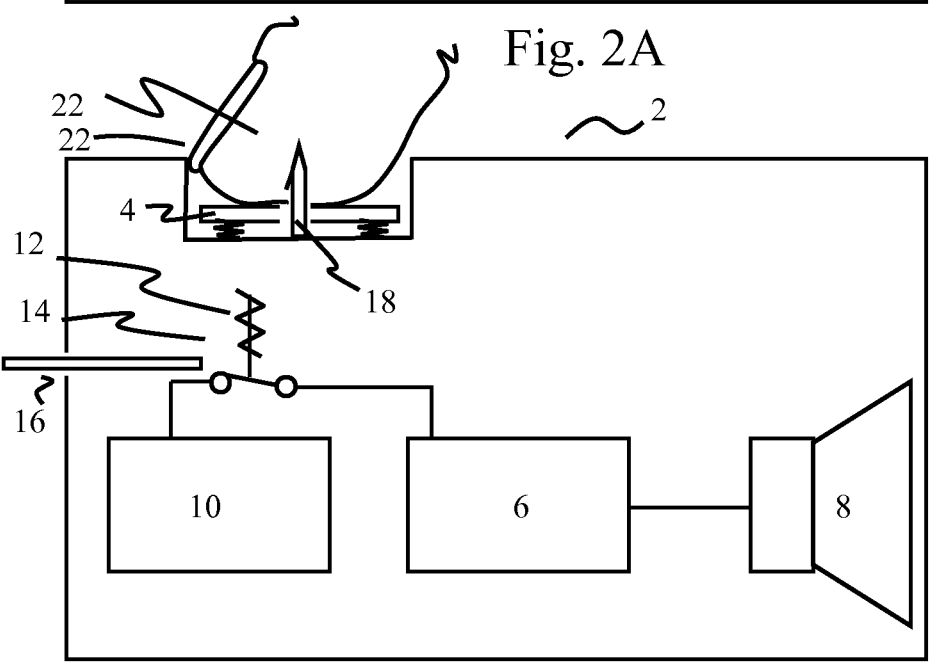

FIGS. 2A and 2B show an embodiment of the portable siren, whose outer switch 4 is provided with an injuring means 18 in the form of a needle or hollow needle or a blade. The outer switch 4 is provided with an opening sealed with a membrane 20 which can be penetrated by the injuring means 18. The injuring means 18 is provided with a barb 20, which is used to take a tissue sample from a fingertip. The outer switch 4 is configured like a dummy switch as on FIG. 1.

FIG. 2B shows the portable siren 2 from FIG. 2A, wherein the outer dummy switch is activated by a finger or thumb tip 22. The loudspeaker 8 sends out an audio signal (not shown), since the inner switching element 14 is closed. The outer dummy switch 4 is pressed down by a finger or thumb tip 22, wherein the injuring means 18 first penetrates through the membrane 20 and then the skin of the thumb tip 22. A pain response triggered by the injuring means 18 will prompt the person who activated the outer dummy switch 4 to cease the activation and throw the portable siren away while in pain. A small tissue or blood sample here remains behind under the barb 20, and can later be used to generate a genetic fingerprint of the activator once the portable siren has been secured by security personnel.

Figure 2C:
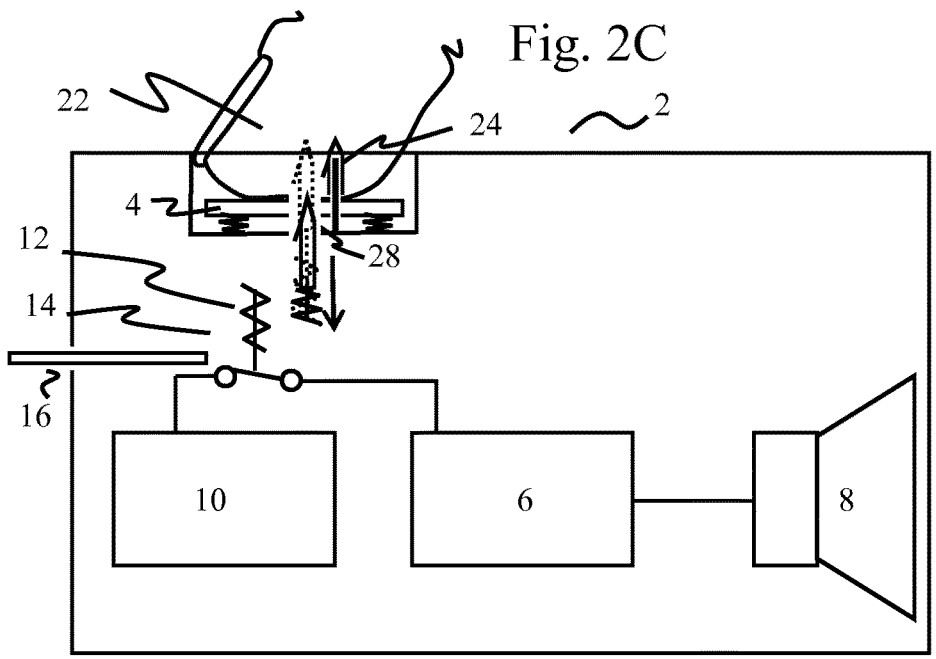
Figure 2D:
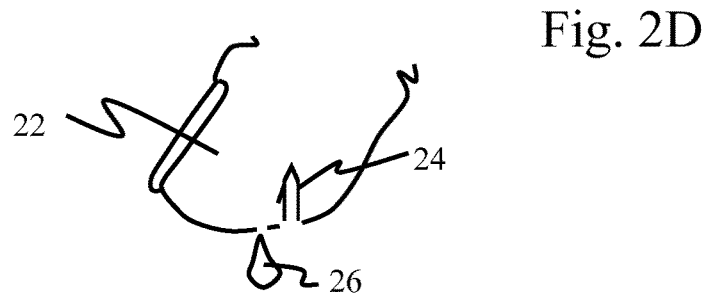

FIG. 2D shows another variant in which the injuring means 18 is additionally provided with a retraction device 28. Blood and tissue samples can only be evaluated if they have not been contaminated by other blood and tissue samples. In the present embodiment, the injuring means 18 is thus retracted into the housing of the portable siren 2 after pricking, so as to prevent contamination of the blood and tissue samples under the barb 20.

In order to be able to better identify the perpetrator, this and/or all other injuring means can further be provided with a coating, for example with silver nitrate. A silver nitrate coating can additionally mark the injury caused by the injuring means 18. It is likewise possible to apply additional chemical components to the injuring means so as to subsequently enable a better identification of the perpetrator/attacker/activator of the outer switch.

The injuring means on FIG. 2C further comprises a small harpoon 24 that preferably penetrates completely into the thumb tip 22 and remains therein. This harpoon 24 can also be provided with a microscopic inscription that prompts a physician charged with treating the wound to potentially hand the treated person over to security personnel. As a result, a perpetrator/attacker/activator of the outer switch can be captured relatively easily. In order to arrive at a treatment by a physician, it can also be provided that the harpoon consist of a pain medication, i.e., a pain causing agent, so as to prompt the perpetrator/attacker/activator of the outer switch to find a physician. It can also be provided that a combination of pain suppressing agents and pain inducing agents be used, which are released one after the other, so as to first mask the cause of the pain, and only later provoke a visit to the physician after a correlation between the attack and activation and the pain is no longer as obvious.

FIG. 2D shows a thumb tip that has a first injury caused by the injuring means 18 and another injury caused by the harpoon 24, wherein blood 26 exits the first injury. As a result of the exiting blood, the perpetrator leaves behind a lot more traces than without the first injury. It can likewise be provided that an anticoagulant and/or a histamine be applied to the injuring means or injected along with it.

The explanations on FIGS. 2A to 2D can relate to a switch that simulates a slight malfunction or jamming. This can be achieved with predetermined breaking points, which indicate a function of the outer switch, such as a jamming. This apparent malfunction can additionally be combined with a slight sound change and diminished volume upon activation up to the predetermined breaking point. In this case, it appears to the person who wants to activate the switch that the latter seams to jam, thereby prompting the person to activate the switch with a greater force. During activation with a distinctly elevated force, it can be ensured that the injuring means 18 will penetrate deeply enough into the finger or thumb tip to reliably take a blood or tissue sample. The elevated force can also contribute to drilling the harpoon deep enough into the flesh so that it disappears under the skin completely, and cannot be pulled out again on site. The injuring device is preferably configured so that it can also penetrate through gloves, and take tissue and blood samples through a glove.

A relatively small but painful and relatively heavily bleeding wound can cause an attacker to cease his or her attack, so that a primary objective of the present invention can be achieved right away.

Figure 2E:
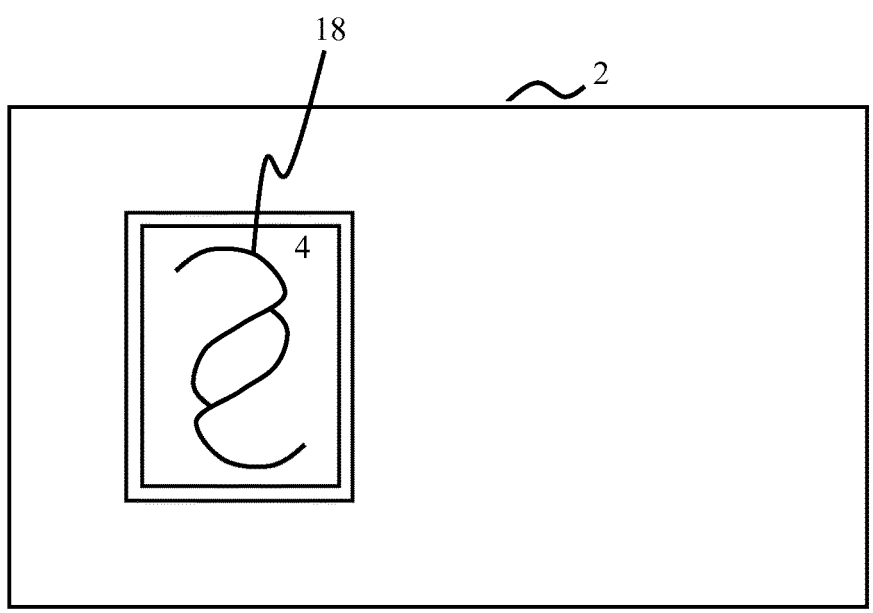

FIG. 2E shows injuring means 18 in the form of a symbol. A mirrored paragraph sign was here used as the symbol. The injuring means 18 here leaves behind a wound or injury in the form of a paragraph, which is intended to let a treating person know that this injury is legally relevant, i.e., came about in conjunction with a criminal offense. In principle, any type of other symbols are possible, such as anarchy signs, or other easily remembered symbols, which prompt an attending physician to recall the injury and treated person especially well, or even to call in colleagues given the special shape of the injury. In any event, it should not be possible for the symbol to arise as the result of a simple, straight cut with a blade, so that an attending person will always ask about the origin and circumstances as well as the cause of the injury. Crosses, stars, smileys or even letters or combinations of letters are also suitable as symbols.

Figure 3:
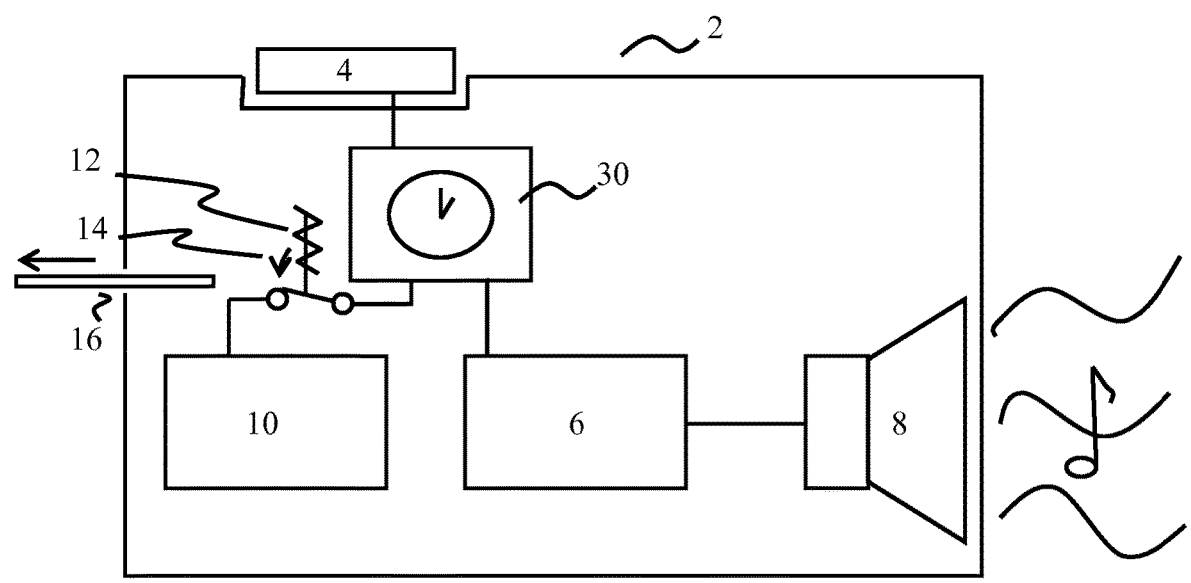

FIG. 3 depicts an additional embodiment in which the outer switch 4 actually performs a function. The portable siren 4 is additionally provided with a delay element or time element 30 that can be activated by the outer switch 4, which when activated by the switch 4 causes the audio signal to be generated by interrupting the power supply of the control unit 6. The interruption by the time element 30 functions similarly to the snooze function in an alarm clock, but only interrupts the audio signal for a few seconds. Enough time that an attacker thinking him or herself in safety can throw away the portable siren shortly before it again starts to emit the audio signal. In an ideal case, the attacker will pick up the siren again and again, and in so doing cease an attack, or allow the attacked person to flee.

Figure 4:
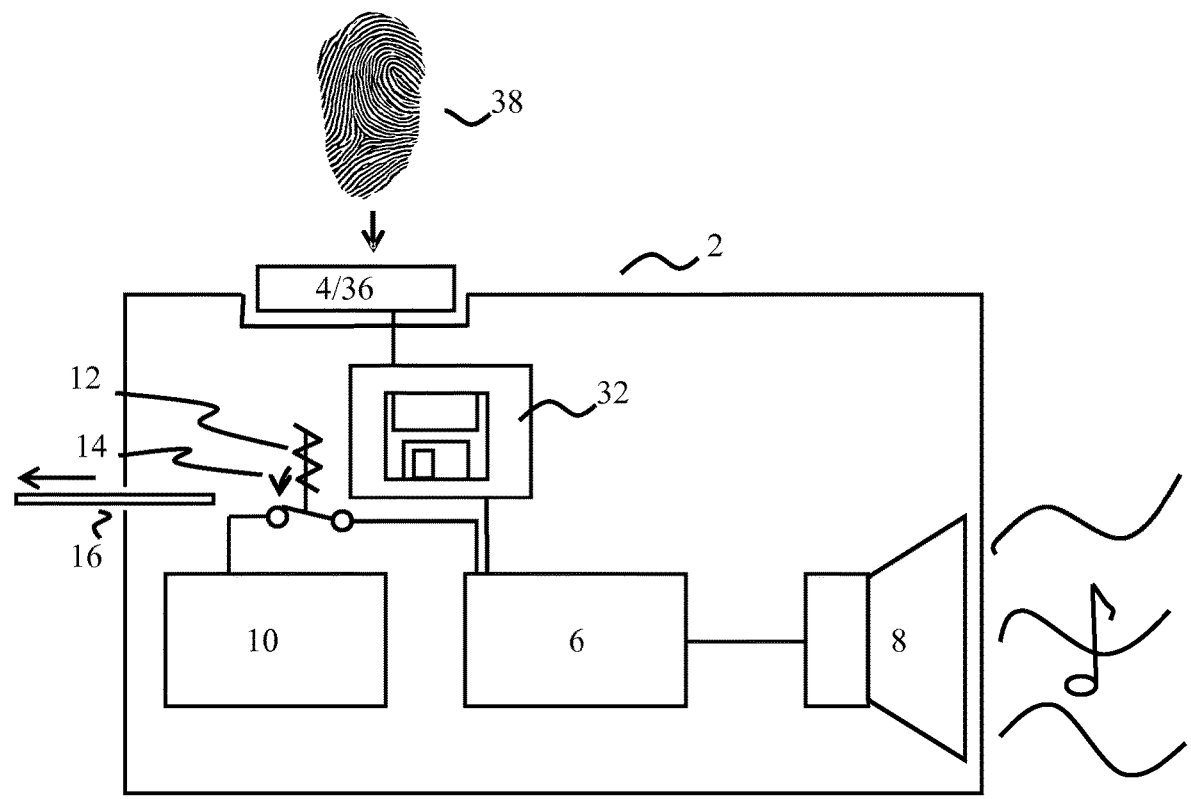

FIG. 4 depicts an embodiment with an outer switch 4, which is simultaneously designed as a fingerprint sensor 36 or electronic fingerprint sensor. Every time the outer switch 4 is activated, a typical criminal fingerprint 38 of an attacker/actuator of the switch 4 can in this way be recorded. The advantage to this embodiment relative to other types of fingerprint recording is that several images of fingerprints can be recorded without the additional activations destroying previous fingerprints, since they can simply be additionally stored in the storage element 32. As a consequence, anyone who finds the already triggered siren at a crime scene cannot destroy any images of stored fingerprints, even given an inadvertent activation of the outer switch. This can be combined in particular with the injuring means in the embodiment on FIG. 2D.

Figure 5:
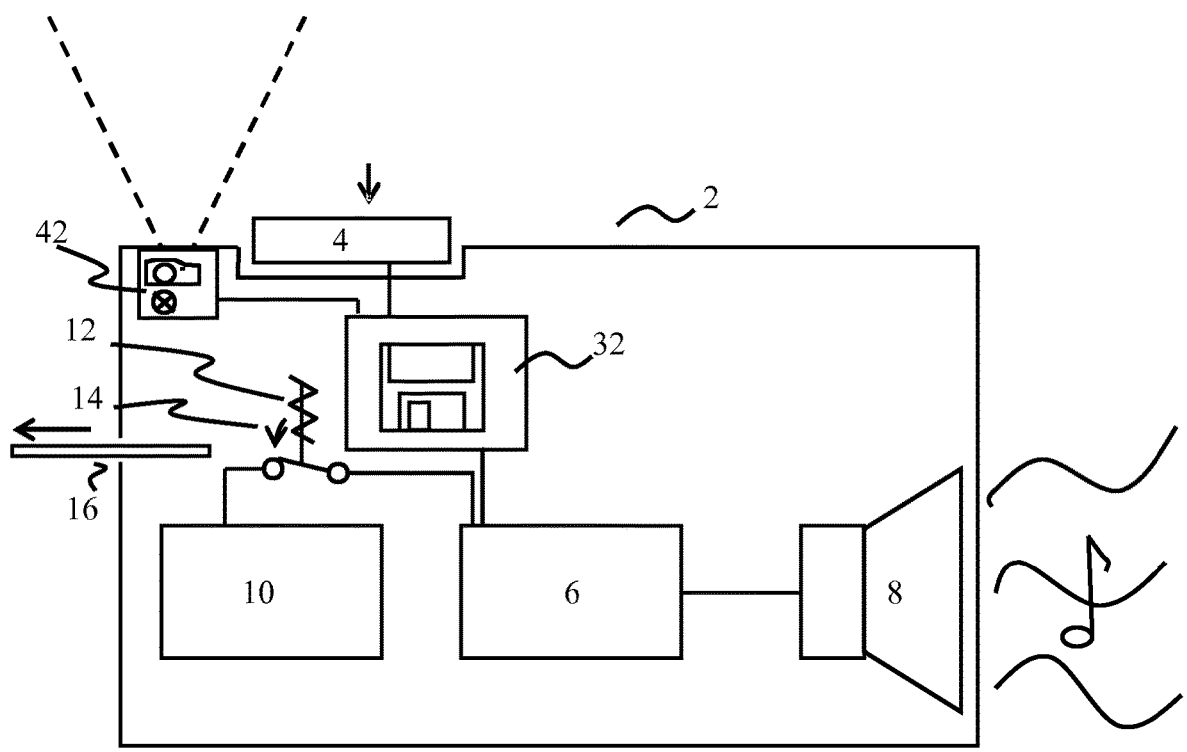

FIG. 5 relates to an embodiment in which a camera and lighting component 42 are provided above the outer switch 4, which can be activated by actuating the outer switch 4 and/or actuating the inner switching element. It is possible for the camera and lighting component to be designed as a video camera with sound recording, which starts recording directly after the inner switching element has been activated. The camera lens is here preferably attached in a concealed manner on the housing of the portable siren 4. A lighting unit can be connected upon activation of the outer switch 4, so as to illuminate the visual field of the camera denoted by the dashed lines. However, it is likewise also possible to operate the camera and lighting component 42 as a still camera, wherein the recording of an image or series of images is triggered upon activation of the outer switch 4. In particular given audio signal pauses, it may also make sense to record sound, so as to additionally identify the perpetrator/attacker based on voice/speech characteristics.

Figure 6:
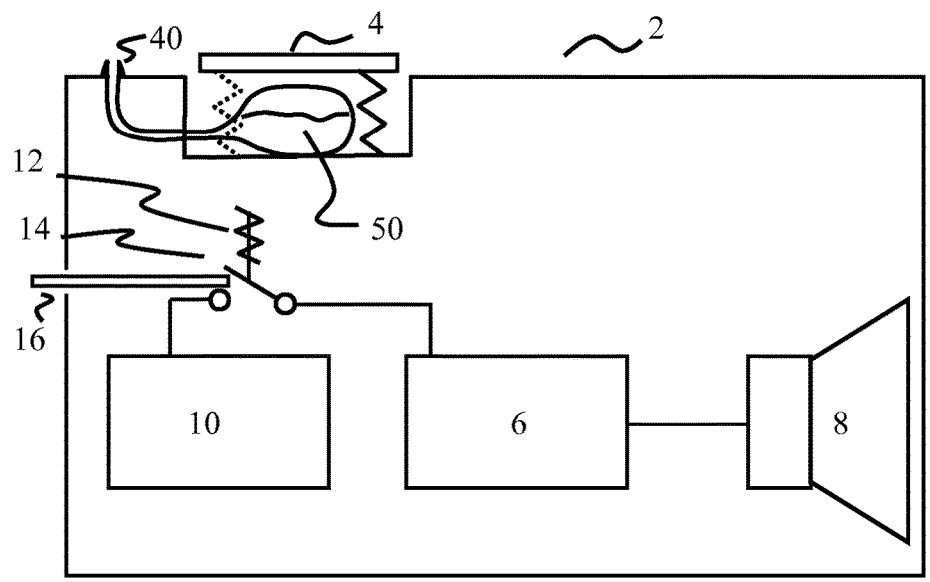

FIG. 6 relates to a portable siren 2, which is additionally provided with a sprayer 50; the sprayer 50 is designed as a fluid-filled bellows. Upon activation of the outer switch 4, the bellows is compressed, and its liquid contents are sprayed through the spray nozzle 40 next to the outer switch 4 in the direction of a person activating the switch 4. A simple embodiment can be configured like a joke article known as a "spray ring". More complex embodiments can consist of several pressure vessels, and several liquids for optical, invisible and/or olfactory marking, as well as for the distraction of the person activating the switch. Suggested at the current time is a combination of silver nitrate solution, a capsaicin solution, a mixture of skunk secretion and butyric acid as well as a solution with fluorescent dye. Due to the close proximity of at most one arm's length, very small quantities of these solutions are here sufficient for relatively reliably marking a person. A few millimeters are here sufficient to achieve a distinct marking. This embodiment can also be combined with additional elements and components of the above embodiments.

Figure 7:
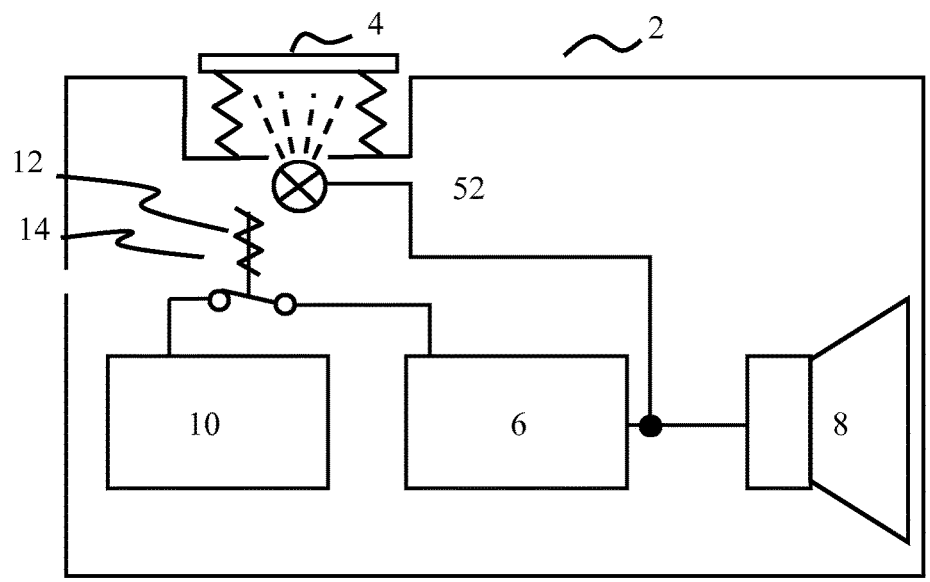

FIG. 7 shows an embodiment of the portable siren 2 in which the outer switch 4 is translucent or has a night design. The trigger pin is pulled, and the audio signal is generated (not depicted). The signal with which the loudspeaker 8 is supplied by the control unit 6 is likewise routed to a lighting unit 52 of the outer switch 4, thereby illuminating the latter. The lighting unit makes it easier for an attacker to find the portable siren, since acoustic localization is difficult in particular at night and at sounds exceeding the pain threshold. If the outer switch has a night design, the attacker can easily recognize the "sound off" symbol even at night. The lighting unit here helps to localize the portable siren, and induce an attacker to activate the outer switch.

Figure 8:
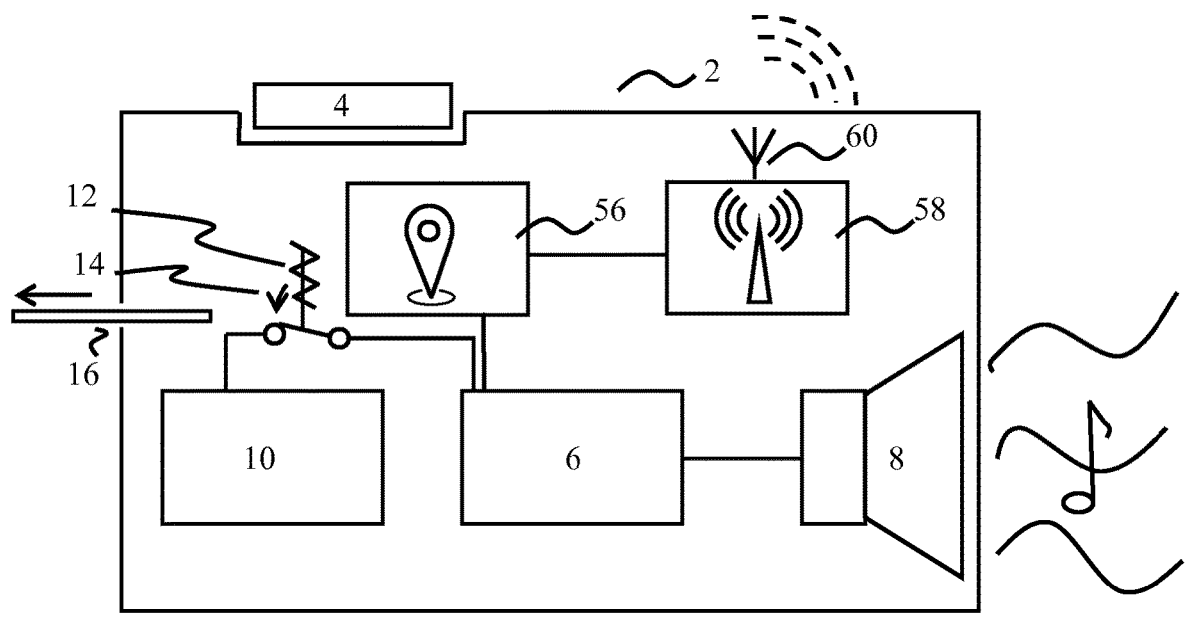

FIG. 8 shows an embodiment in which the portable siren 2 is provided with a GPS positioning device 56 as well as a mobile radio communication device 58 with a mobile radio communication antenna 60. After the inner switching element 14 has been activated or the audio signal has been triggered, the controller 6 actuates the GPS positioning system 56, so as to determine a current position of the portable siren 2. Once the current position has been determined, it is transmitted to the mobile radio communication device 58 and relayed to a control center or service provider via the antenna 60. In this embodiment, positional information can be used to more easily find the portable siren as the track carrier of an attacker. This is also possible if for whatever reason the portable siren was removed from a crime scene after the attack, since the position data can be updated, for example once per hour or every 10 minutes or once a day. In order to avoid incorrect operations, it is also possible to start the positioning determining and relaying process only after the outer switch has been activated, since no traces of the perpetrator are presumably to be expected on the siren without any such activation.

Figure 9:
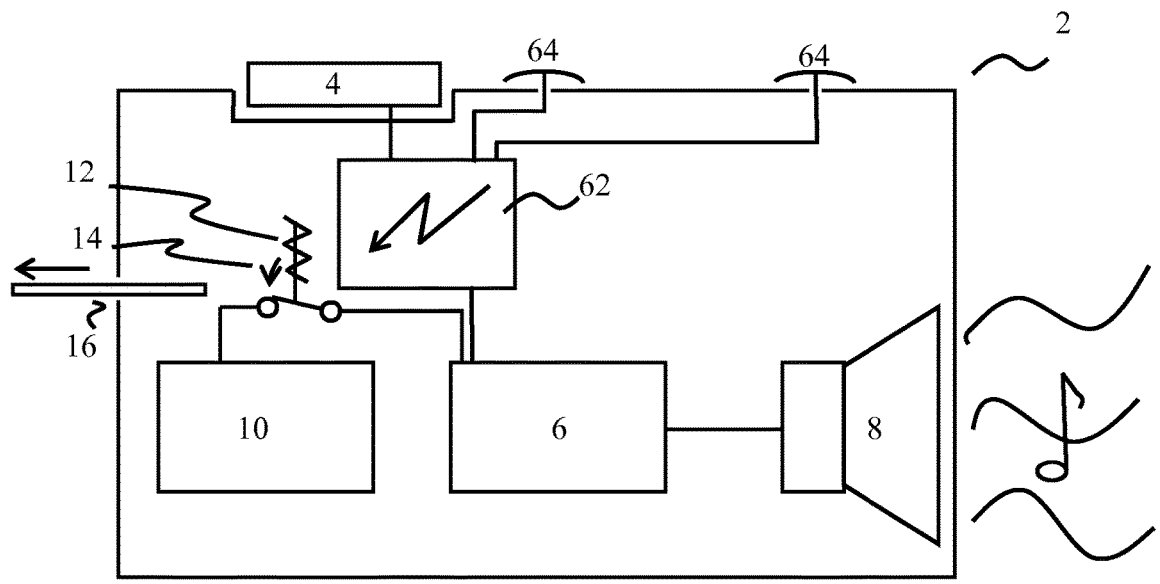

FIG. 9 shows an embodiment in which the portable siren is further provided with an electric pulse device or high-voltage generator. The high-voltage generator is connected with at least two [skin electrodes 64 arranged] outside on a housing of the portable siren 2. The skin electrodes 64 are arranged in such a way that an unsuspecting person who picks up the portable siren and holds it so as to enable an easy activation of the outer switch touches at least two different electrodes. Upon activation of the switch 4, at least one high-voltage electric pulse is conducted to the skin contacts. The pulse is intended to make the attacker drop the siren again, since the expectation is that the latter has already secured traces of the perpetrator. The electric pulse can also be emitted with a slight delay, so as not to impede the recording of fingerprints or the camera right away. It is also possible to use electrodes and pulses that are able to penetrate through gloves, if an attacker is wearing gloves.

Figure 10A:
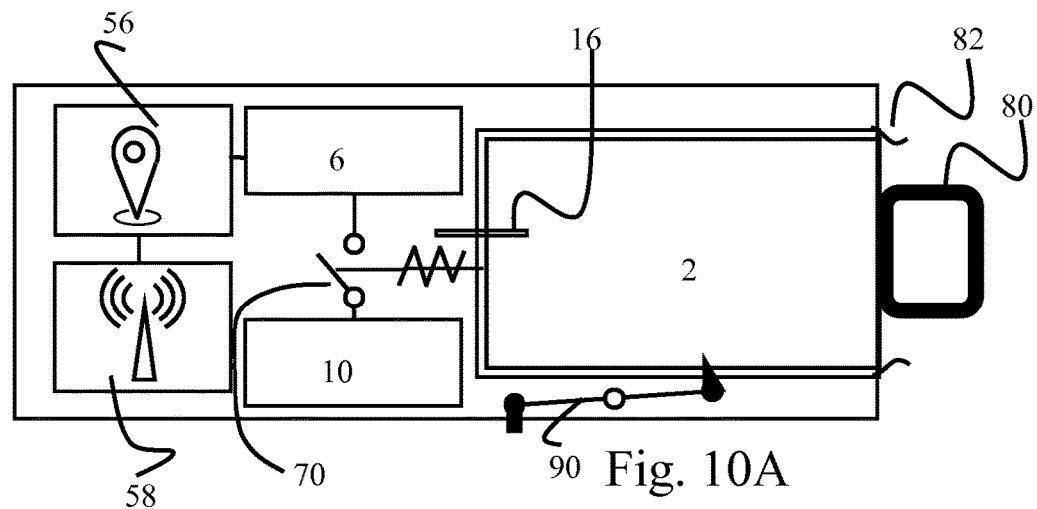
FIGS. 10A and 10B show an emergency call device according to the invention, which is combined with one of the portable sirens on FIGS. 1 to 8.

FIG. 10A shows an emergency call mechanism or emergency call device 68 and a portable siren 2, or a combination of these components. The emergency call device consists of a GPS positioning component 56 as well as a mobile radio communication component 58 (with integrated antenna) corresponding to the embodiment of the portable siren 2 on FIG. 8. The emergency call device 68 and the portable siren 2 are connected with each other by a shared mechanical interface. The portable siren 2 is here accommodated in a hollow space of the emergency call device 68, and is held in the emergency call device by retaining clamps 82 along with a latched safety catch or securing device 90. The emergency call device 68 is provided with an emergency call trigger 70 in the form of a switch. As long as the portable siren is arranged inside of the emergency call device 68, the emergency call trigger 70 or corresponding switch is kept open, and no emergency call is made. The portable siren 2 is provided with a grip 80, with which the portable [siren 2] can be pulled out of the emergency call device 68 against the force of the retaining clamps with the securing device released.

Figure 10B:
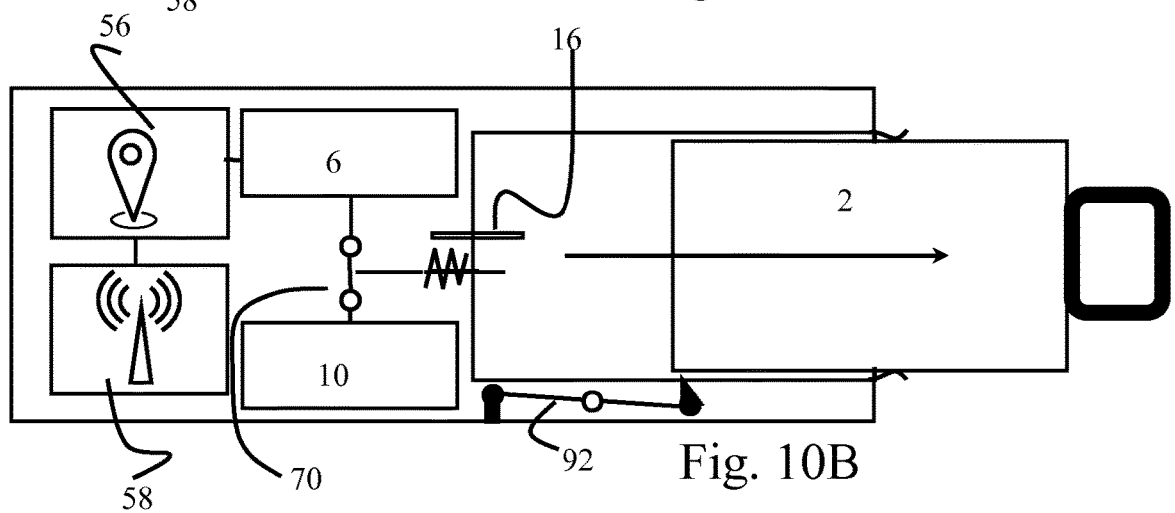

On FIG. 10B, the securing device 92 is triggered, and the portable siren 2 is pulled out of the emergency call device by the grip 80 against the spring force of the retaining clamps/springs. The trigger pin 16 remains in the emergency call device 68, and thereby directly (or with a slight delay) triggers the audio signal on the portable siren. Without the portable siren, a spring of the emergency call trigger 70 can close its contacts and trigger an emergency call. The current position of the emergency call device 68 is here first determined, and then relayed to a control center by security personnel via the mobile radio communication component 58. The alarmed security personnel can then dispatch a patrol or other assistance. The portable siren 4 is further pulled completely out of the emergency call device 68 and thrown in front of the feet of the attacker or behind the attacker. The portable siren preferably combines one, several or further preferably even all components as described in the embodiments on FIGS. 1 to 9. The emergency call mechanism ideally remains with the attacked person, so that his or her position can continue to be tracked even given an abduction or a kidnapping in progress. By contrast, the portable siren, which in the meantime has become a track carrier of the attacker(s) due to the above features, remains behind at the crime scene. The track carrier is here intended to help find and convict the perpetrator(s). The construction on FIGS. 10A and 10B prevents the outer switch 4 of the portable siren 2 from being inadvertently activated, since it is covered by a portion of a housing of the emergency call device.

A combination of an external outer switch and a loudspeaker for use with a mobile terminal (mPERS) for purposes of externally triggering an emergency sequence with the option of emitting an audio signal preferably with a high sound pressure, in which an outer switch is built onto the siren and can be used to turn the sound on and off.

In an embodiment, the sound can be turned on but not off with the outer switch.

It is also provided that the built-in outer switch can be activated, but has no function, and that the audio signal is triggered in a different way.

An embodiment involves the use of a housing construction that resembles the outer switch.

In an additional embodiment, an edge of the outer switch or outer dummy switch is sharper or sharp-edged or jagged in design, so as to injure the skin belonging to a body part that activates the outer switch or outer dummy switch during use.

The outer switch or outer dummy switch is preferably designed in such a way that it lights up when the alarm is triggered.

The outer switch or outer dummy switch is preferably marked for better visibility.

It is further preferable that a lamp be built in either in addition or on its own, wherein the siren is configured in such a way as to be turned on when the alarm is triggered.

As a whole, the portable siren can be used to achieve a simple method for convicting attackers above all during attempted violent crimes upon triggering the alarm of an emergency backup system by fooling the attacker.

Also on the market are external accessories, in which triggering mostly takes place via a Bluetooth connection to the mobile terminal in such a way that either a fall is discovered by the external device (referred to as fall sensor) and/or the user activates an outer switch, which sends a preferably encoded signal to the mobile terminal, which then further triggers the emergency sequence.

A siren can be used to fend off an attacker especially intensively by confusing him or her with the sound pressure and him or her having to fear an intervention by third parties within hearing range. The present device enables a method in which, regardless of whether the attack persists or the attacker relents, it becomes easier to later arrest the attacker by having him or her leave behind information about him or herself like on a business card, and making the crime scene known.

According to the UNHCR reports, only 30 out of 100 rapes are prosecuted even in industrialized countries, with three of those leading to court proceedings, and only one out of 100 rapists ever having to fear more than one day of jail. The reasons why are
- the challenging body of evidence which makes it difficult or impossible for the police and public prosecutors to search for the perpetrator;
- the inability of the victim to describe the perpetrator due to darkness or disguises, and later unambiguously identify him;
- the one word against another situation during and before the court proceeding.

The method described here prevents the impasse and provides the police with clear indices as to how a perpetrator can be found and/or convicted.

A triggering unit can be physically combined with an alarm device, preferably a piezo alarm, for example which sends out a signal with a high sound pressure or in proximity to the triggering device associated with the ability to separate the triggering device from the siren, or the triggering can take place externally on a device the user preferably carries on his or her body, but not in combination with the external accessory, i.e., the outer switch, but rather separately and independently thereof. Regardless of how the physical and electronic configuration comes about, the alarm device (siren) is expanded to include a device to fool the attacker. Described is a functioning or non-functioning outer switch or even a construction, housing structure or elevation (or also "recess") on the siren that resembles an outer switch, which creates the impression that the sound can be turned off by pressing upon it. This is intended to induce the attacker to press the outer switch, so that the latter leaves behind information about him or herself.

There can be at least two variants and at least three subvariants. In a first variant, the sound can be triggered by activating a functioning outer switch. A first subvariant makes it possible to turn off the audio signal with the outer switch. In this variant, the sound can actually be ended by pressing the outer switch in a specific way, whether it be in a specific direction or in a specific button sequence, e.g., like for a Morse code.

In a second subvariant, deactivation is only possible using other methods. Deactivation here cannot take place via the outer switch, e.g., using a key or electronically, e.g., by way of a radio signal or an inner switching element.

In a second embodiment, triggering takes place externally, whether it be by removing a pin, taking the siren out of a mount, or electronically, e.g., by radio, or the like, and the outer switch is "blind" or only represents a dummy switch. A subvariant here involves a real outer switch without any function, which is simply not connected. A real outer switch is here installed in the housing of the siren, but has no function. Another subvariant only has an outer dummy switch. In this variant, a component resembling an outer switch is built into the housing of the siren, which either protrudes or is recessed. For better visibility, the latter is preferably marked in color, gray or with an audio signal symbol or similar symbols. In an additional subvariant, a sharp edge is located on the edge of the outer switch or dummy. In a further subvariant, the edge of the outer switch, whether real or fake, will be sharp or jagged and have a groove.

A victim or attacked person triggers the alarm. He or she tosses the siren at the feet of the attacker. The latter will attempt to flee or instinctively reach for the siren and now try to turn it off. He or she will not succeed in doing so, and thus give up trying after some time. This already gives the victim the time to absent him or herself from the scene. The attacker will activate the outer switch in an attempt to turn off the siren, and after failed attempts finally drop the latter, since he or she would not like to walk around with the siren, given that it is precisely what is drawing attention to him or her. In the futile attempt to activate the outer switch and turn off the noise, the attacker leaves behind his or her fingerprint on at least the real or fake outer switch, his or her DNA, and finally, in the case of the sharp or jagged edge, perhaps even skin flakes and, in the best case scenario, tiny blood traces, in case he or she has been cut, on the outer switch and/or in the groove.

Even after the battery is empty, finding the siren is easily possible, since it lies precisely where the alarm was triggered by the victim. A simultaneously triggered emergency call device here recorded the triggering location. As a consequence, the police can secure the real or genetic fingerprint of the perpetrator; the perpetrator must explain why that fingerprint is on an alarm device that was found at the scene of a declared crime, and in the event of two contradictory statements, why consensual sexual relations took place despite a triggered siren alarm.

The real or fake outer switch or outer dummy switch is preferably marked in color or gray and/or with an audio or some other symbol to prompt the attacker to press the outer switch. In a special modification, the outer switch can begin lighting up as the siren starts, so as to indicate the location of the outer switch or outer dummy switch to the attacker. In a further modification, a lighting unit can be installed that preferably has a smooth surface and lights up when the alarm starts, preferably brightly. This is intended to brighten the face of the attacker so as to make the situation visible for third parties in the glistening light, and task the attacker with shutting off both the noise and light, i.e., do two things he or she cannot do.

REFERENCE LIST

2 Portable siren
4 Outer switch/outer dummy switch
6 Controller
8 Loudspeaker/electroacoustic transducer
10 Battery
12 Pre-loading spring contact closure spring
14 Inner switching element
16 Triggering unit/trigger pin
18 Injuring means
20 Barb
22 Finger/thumb
24 Harpoon
26 Blood
28 Retraction device
30 Time/delay element, can be activated by the outer switch
32 Storage element
36 Fingerprint scanner, here integrated into the outer switch
38 Fingerprint
40 Spray nozzle
42 Camera/sound recorder/lighting component
50 Sprayer with fluid filling
52 Lighting for outer switch
56 GPS positioning device
58 Mobile radio communication device
60 Mobile radio communication antenna
62 High-voltage generator
64 Skin contacts
68 Emergency call device
70 Emergency call trigger
80 Access
82 Retaining brackets
84 Sound off symbol/marking
90 Securing device latched
92 Securing device triggered

What is claimed is:

1. A portable siren, comprising
a loudspeaker (8) so as to output an audio signal with a high sound pressure;
an inner switching element (14) for turning the audio signal on and off,
characterized in that
the inner switching element for deactivation cannot be activated without a tool, and that
the portable siren further comprises an outer switch and/or an outer dummy switch (4),
wherein deactivation cannot take place via the outer switch or outer dummy switch (4), and
wherein the outer switch or outer dummy switch (4) is provided with a device for recording a fingerprint or thumbprint (38) of a finger that wants to activate the outer switch or outer dummy switch (4).

2. The portable siren (2) according to claim 1, wherein the outer dummy switch can be activated, and upon activation has a key path and/or a key stop and/or a key sound as a response to the activation.

3. The portable siren (2) according to claim 1, wherein the outer switch and/or outer dummy switch has injuring means (18), so as to injure the skin of a user upon activation.

4. The portable siren (2) according to claim 3, wherein the injuring means (18) has a sharp or jagged edge or sharp or jagged structures.

5. The portable siren (2) according to claim 3, wherein the injuring means (18) comprises at least one needle, hollow needle and/or at least one lancet or blade, which is preferably provided with barbs (20).

6. The portable siren (2) according to claim 5, wherein the injuring means (18) provided with barbs (20) is detachable, so that part of the injuring means (18) can remain in the wound upon activation.

7. The portable siren (2) according to claim 3, wherein the injuring means (18) is further provided with an injector, so as to introduce a liquid, preferably an irritant, a medication and/or a substance, pigment or pigment solution into the wound (18).

8. The portable siren (2) according to claim 3, wherein the injuring means (18) is provided with an automatic pricking and/or retraction function (28).

9. The portable siren (2) according to claim 3, wherein the injuring means (18) is set up to produce an injury in the form of a symbol.

10. The portable siren (2) according to claim 1, wherein the latter further comprises at least one spraying device (50), so as to spray one or more liquids or fluids, wherein the spraying device (50) is connected with the outer switch and/or outer dummy switch (4), so as to spray the one or several liquids or fluids upon activation of the outer switch or outer dummy switch (4).

11. The portable siren (2) according to claim 1, wherein the outer switch and/or outer dummy switch are illuminated, and/or wherein the siren comprises a device (52) that lights up the outer switch and/or outer dummy switch (4) when the audio signal is triggered.

12. The portable siren (2) according to claim 1, wherein the outer switch and/or outer dummy switch is marked in color and/or by a symbol, preferably an on/off switch symbol or a sound-off symbol (84).

13. The portable siren (2) according to claim 1, wherein the siren further comprises a lamp or stroboscope flash, which is activated with the audio signal turned on or upon activation of the outer switch or outer dummy switch (4).

14. The portable siren (2) according to claim 1, wherein the siren further comprises a local or global positioning component (56) and/or a communication component, which are preferably activated with the audio signal turned on.

15. The portable siren (2) according to claim 1, wherein the siren further comprises a bang signaling device, which is activated upon activation of the outer switch or outer dummy switch (4), preferably with the audio signal turned on.

16. The portable siren (2) according to claim 1, wherein the outer switch does not turn off the audio signal, but only briefly interrupts it, preferably for 0.5 to 5, further preferably 1 to 4, and even further preferably 1.5 to 3 seconds.

17. The portable siren (2) according to claim 1, wherein the siren further comprises a sound recorder and/or a camera (42), which starts at least one sound and/or image or video recording process upon triggering the audio signal and/or upon activation of the outer switch and/or outer dummy switch (4).

18. The portable siren (2) according to claim 1, wherein the siren is further provided with skin contacts (64) and an electric pulse generator, which is connected with the skin contacts (64), wherein the portable siren (2) is configured to emit the electric pulses from the electric pulse device to the skin contacts (64) when the outer switch and/or outer dummy switch is activated.

19. The portable siren (2) according to claim 1, wherein the siren can be connected with an emergency call device (68) via a detachable mechanical, electrical and/or radio interface, wherein the portable siren is configured to trigger the audio signal given a separation of the interface to a connected emergency call device (68).

20. An emergency call device (68), comprising a local or global positioning component (56) and a communication component (58) as well as an emergency call triggering device (70), wherein the emergency call device (68) is connected with a portable siren according to claim 1 via a detachable mechanical, electrical and/or radio interface, and wherein the emergency call device (68) is further configured to transmit an emergency call by way of the communication component given a separation of the interface with the portable siren.

21. The emergency call device (68) according to claim 20, wherein the emergency call device (68) is configured to trigger the audio signal via a radio connection given a separation of the interface.

22. The emergency call device (68) according to claim 20, wherein the emergency call device (68) is disguised as another object.

23. A portable siren (2) and emergency call device (68), wherein the portable siren is configured according to claim 1 and the emergency call device (68) comprises a local or global positioning component (56) and a communication component (58) as well as an emergency call triggering device (70), wherein the emergency call device (68) is connected with the portable siren via a detachable mechanical, electrical and/or radio interface, and wherein the emergency call device (68) is further configured to transmit an emergency call by way of the communication component given a separation of the interface with the portable siren.

* * * * *